United States Patent
Hutchins et al.

(10) Patent No.: US 8,296,759 B1
(45) Date of Patent: Oct. 23, 2012

(54) OFFLOADING OPERATIONS TO A REPLICATE VIRTUAL MACHINE

(75) Inventors: Greg Hutchins, Palo Alto, CA (US); Christian Czezatke, San Francisco, CA (US); Satyam B. Vaghani, Palo Alto, CA (US); Mallik Mahalingam, Sunnyvale, CA (US); Shaw Chuang, Mountain View, CA (US); Bich Cau Le, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 1446 days.

(21) Appl. No.: 11/545,662

(22) Filed: Oct. 10, 2006

Related U.S. Application Data (60) Provisional application No. 60/788,032, filed on Mar. 31, 2006.

(51) Int. Cl.
*G06F 9/455* (2006.01)
*G06F 15/173* (2006.01)

(52) U.S. Cl. ............................................ 718/1; 709/223
(58) Field of Classification Search ........................ None
See application file for complete search history.

(56) References Cited

U.S. PATENT DOCUMENTS

| | | | | |
|---|---|---|---|---|
| 7,093,086 B1 * | 8/2006 | van Rietschote | ............. | 711/161 |
| 7,607,129 B2 * | 10/2009 | Rosu et al. | ......................... | 718/1 |
| 7,802,251 B2 * | 9/2010 | Kitamura | ......................... | 718/1 |
| 2005/0091354 A1 * | 4/2005 | Lowell et al. | ................. | 709/223 |
| 2005/0204357 A1 * | 9/2005 | Garg et al. | ......................... | 718/1 |

* cited by examiner

*Primary Examiner* — Kenneth Tang (57) ABSTRACT

A method and system for offloading a software application intended to be run on a first virtual machine onto a second virtual machine. An original virtual machine is created. A periodic and/or computing resource-intensive application is supposed to be run on the original virtual machine. However, doing so may detrimentally impact the operation of the original virtual machine by consuming valuable computing resources. A replicated virtual machine which is basically a copy of the original virtual machine is created and ported over to a different host computer system. The periodic and/or computing-intensive application is now run on the replicated virtual machine instead of the original virtual machine. This leaves the original virtual machine free to continue its normal operations unaffected.

19 Claims, 7 Drawing Sheets

OFFLOADING OPERATIONS TO A REPLICATE VIRTUAL MACHINE

CROSS-REFERENCE TO RELATED APPLICATION(S)

This application claims benefit under 35 U.S.C. §119(e) of U.S. Provisional Application No. 60/788,032, filed 31 Mar. 2006.

BACKGROUND OF THE INVENTION

1. Field of the Invention

This invention relates to offloading particular operations onto a replicate virtual machine in order to minimize the impact of those operations on the original virtual machine.

2. Description of the Related Art

Typically, computers are dedicated to individuals or to specific applications.

For example, an individual owns or is assigned his or her own personal computer (PC). Each time a business hires an employee whose job entails access to a computer, a new PC must be purchased and installed for that new hire. In other cases, a PC or server may be used to perform a specific task. For example, a corporation could have a server for hosting the company's web site, another server for handling emails, and yet another server for handling financial transactions. This one-to-one paradigm is simple, straightforward, flexible, and readily upgradeable. However, one drawback to this set-up is that it is inefficient from a computer resource perspective.

The inefficiency stems from the fact that most software applications do not fully utilize the full processing potential of the computer upon which that software is installed. The processing power of a computer is largely defined by its interconnected hardware components. However, when creating software, programmers do not know the specific hardware capabilities of the computers upon which their software is to be ultimately installed upon. Consequently, programmers tend to be conservative when creating software in order to ensure that software can run on the vast majority of conventional, contemporary PCs or servers. As a result, software applications do not push the envelope set by hardware constraints. Furthermore, some applications may consume a great deal of processing power, while other computer applications are inherently less computing intensive. When the PC or server is running less computationally intensive applications, much of its hardware resources are underutilized. Furthermore, given hundreds or thousands of computers networked in an enterprise, the cumulative effect of the amount of wasted computing resources adds up.

In an effort to take advantage of all the underutilized computing resources, there have been efforts to design "virtual" machines. Basically, a virtual machine entails loading a piece of software onto a physical "host" computer so that more than one user can utilize the resources of that host computer. In other words, the virtual software package is loaded onto one or more physical host computers so that the processing resources of the host computers can be shared amongst many different users. By sharing computing resources, virtual machines make more efficient use of existing computers. Moreover, each user accesses the host computer through his own virtual machine. From the viewpoint of the user, it appears as if he were using his own computer. Users can continue to operate in a manner that they had grown accustomed to in interacting with computers. Thus, rather than buying, installing, and maintaining new computers, companies can simply load virtual machine software to get more leverage off their existing computers. Furthermore, virtual machines do not entail any special training because they run transparent to the user. In addition, virtual machines have the ability to run multiple instances of operating systems—even different operating system—concurrently on the same host or a group of hosts. As one of many examples of the benefits of this, a single user may then run applications on one trusted operating system while safely testing software written to run on a different operating system.

Unfortunately, there is one drawback manifest in exploiting virtual machines to their full potential: Because virtual machines are designed to maximize the most efficient use of the computing resources, there is typically not very much of the spare computing resources left over. Any spare computing resources are often used to host another virtual machine for another user. It is this very economic efficiency which poses serious issues with certain types of applications. Some applications are run infrequently, but when they do execute, these applications are extremely computing intensive. For example, backup applications are often used to backup a company's data. The data is backed up periodically and stored in backup files so that if there happens to be a computer crash or failure, important data is not irretrievably lost. Backing up files is an important function, but it needs to be run only periodically; however, when it does run, it can consume a great deal of computing resources in terms of input/output (I/O) and processing bandwidth. Similarly, data mining and virus scanning applications also fall into the category of applications which are run periodically and which consume an inordinate amount of computer resources when they do execute.

In the past, when dedicated computers had a thick cushion of unused computing resources, these periodic computer resource-intensive applications could execute in the background without disrupting or affecting the user's normal operation. However, with virtual machines, there are typically no spare computing resources to fall back on. Thus, IT administrators are faced with a dilemma: They could run the periodic applications and have the virtual machines suffer a performance hit. However, this is problematic when dealing with mission-critical applications. For example, one would not want to impact the server handling a company's sales orders, even though backing up the sales information is vital. Alternatively, IT administrators could choose to use dedicated computers, but this is wasteful of computing resources.

SUMMARY OF THE INVENTION

This invention comprises a method and system for offloading a software application intended to be run on a first virtual machine onto a second virtual machine. An original virtual machine is created. A periodic and/or computing resource-intensive application is supposed to be run on the original virtual machine. However, doing so may detrimentally impact the operation of the original virtual machine by consuming valuable computing resources. A replicated virtual machine, which is basically a copy of the original virtual machine, is created. The periodic and/or computing intensive application is now run on the replicated virtual machine instead of the original virtual machine. Meanwhile, applications on the original virtual machine can continue to operate as normal.

In one embodiment, both the original virtual machine and the replicated virtual machine are run on the same host computer system. Resource constraints can be imposed to control the amount of computing resources allocated to the original and replicated virtual machines. In another embodiment, the original virtual machine is run on one host computer system whereas the replicated virtual machine is run on a different host system. Because the application on the replicated virtual machine is run on a different set of hardware components, this leaves the original virtual machine free to continue its normal operations unaffected.

DETAILED DESCRIPTION

The present invention pertains to offloading particular operations onto a replicated virtual machine in order to minimize the effects of those operations on the original virtual machine. Initially, software for creating, running, and maintaining virtual machines is installed upon one or more physical computer systems. These physical computer systems act as hosts to virtual machines, which share the computing resources of the physical computer systems. Certain software applications which tend to be periodically run and which are computing resource-intensive are identified. When one of these applications is being called upon for execution on a particular virtual machine, a replicate of that virtual machine is created. In other words, a "cloned" virtual machine, which is a copy of the original virtual machine, is created. In the past, the computing resource-intensive application would have to be run on the original virtual machine due its uniqueness. For example, a backup application could be scheduled to routinely backup the information corresponding to the original virtual machine.

In another example, an anti-virus scan could periodically run on the original virtual machine to detect and fix any potential viruses. Data mining applications can be initiated to track or analyze data being processed, accessed or otherwise associated with that original virtual machine. In the past, running these computing resource-intensive applications on the original virtual machine can detrimentally impact its other operations. But in the present invention, the software application is run, not on the original virtual machine, but instead on the replicated virtual machine. By running the computing resource-intensive application on the replicated virtual machine, the original virtual machine can continue to perform its other operations with little to no detrimental impact. Meanwhile, the computing resource-intensive application, having been successfully offloaded onto the replicated virtual machine, is run separately. The present invention confers the best of both worlds: highly efficient management of periodic spikes of computing resource demands with minimal impact on the normal operations of virtual machines.

Figure 1:
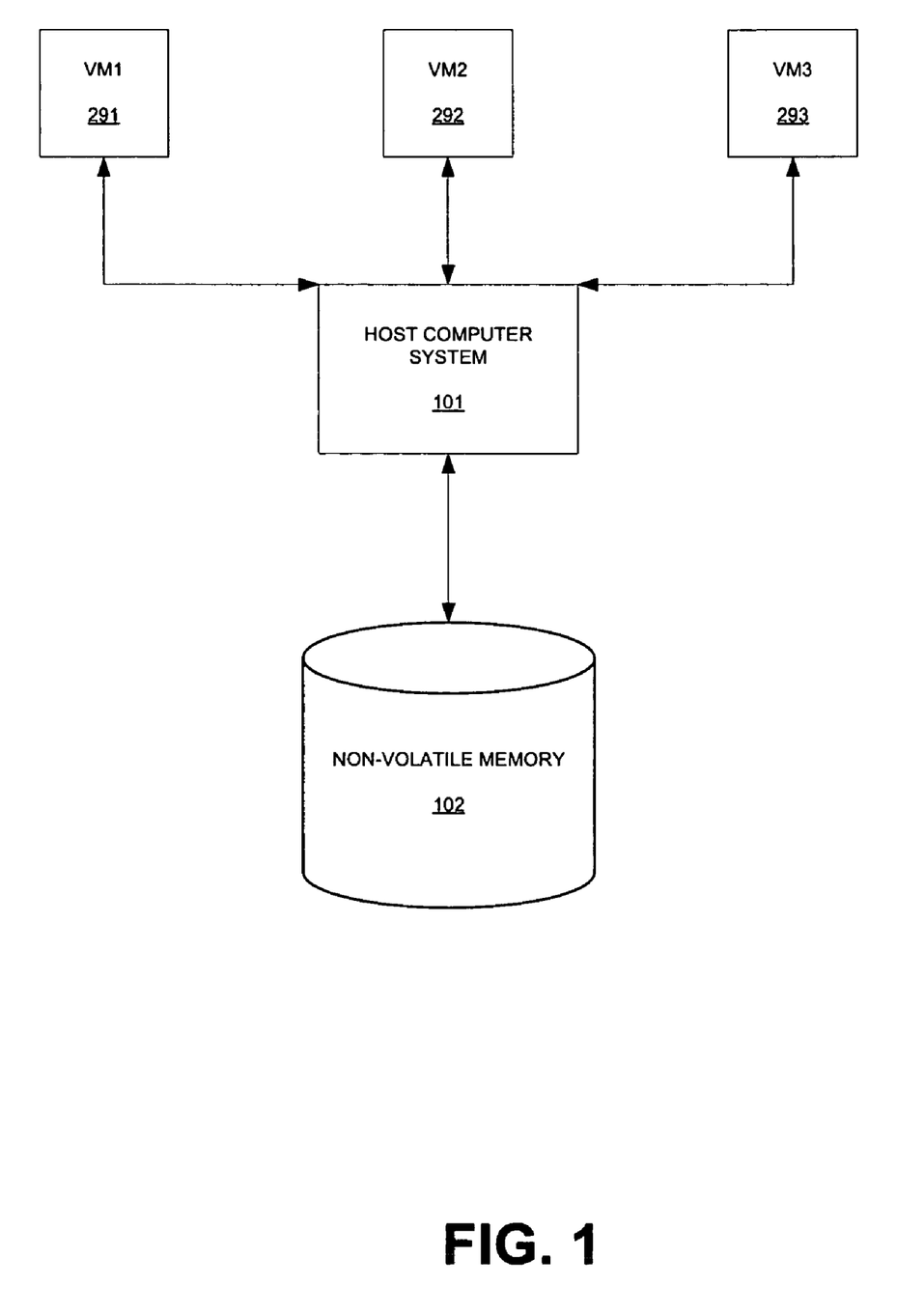
FIG. 1 illustrates computer system for hosting an original virtual machine and a replicated virtual machine

In one embodiment, the replicated virtual machine is run on the same host computer system as that of the original virtual machine. Referring now to FIG. 1, a host computer system 101 is shown. Host computer system 101 can be any type computer, such as a PC, a server, a workstation, a mainframe computer, etc. Host computer system 101 contains basic hardware components (e.g., one or more microprocessors, volatile and/or non-volatile memory, busses, one or more I/O interface, etc.).

In one embodiment, an operating system is installed on host computer system 101. The operating system functions as an interface between software applications and the corresponding hardware components. In another embodiment, specially developed software such as VMware ESX Server™ runs directly on the bare metal hardware and performs the functions of an operating system for virtual machines running on it. One or more virtual machines 291 and 292 are created by known virtualization software.

Users of the virtual machines 291 and 292 can process and store data contained in a non-volatile memory 102. Non-volatile memory stores digital data and can be a storage area network device, hard disk array, tape drive, etc. In this embodiment, whenever a potentially computing resource-intensive application is to be run on one of the virtual machines, a replicate of that particular virtual machine is created. For example, if the computing resource-intensive application is to be run on virtual machine VM1 291, the original VM1 291 is replicated. The replicated virtual machine VM1* 293 is created and instantiated on host computer system 101. The computing resource-intensive application is then run on the replicated virtual machine VM1* 293. By offloading the computing resource-intensive application onto the replicated virtual machine, an administrator can control how much computing resources are to be allocated between the original virtual machine (e.g., VM1 291), the replicated virtual machine (e.g., VM1* 293), and/or other virtual machines (e.g., VM2 292) running on the host computer system 101. The administrator now has the ability to limit the amount of computing resources allocated to the replicated virtual machine such that it will have little to no effect on the normal operations of the original virtual machine and/or other virtual machines. Once the computing resource-intensive application completes its execution, the replicated virtual machine can be discarded.

Figure 2:
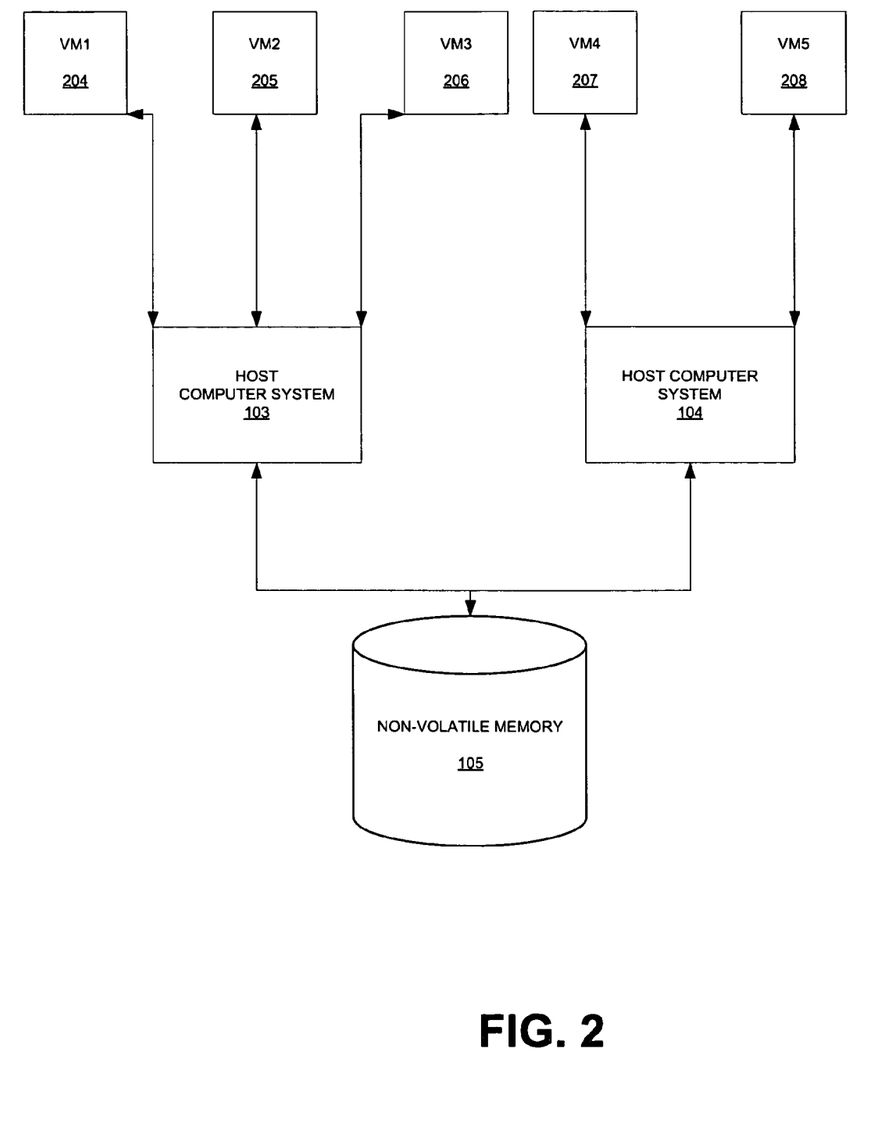
FIG. 2 illustrates two host computer systems whereby one computer system hosts the original virtual machine and a different computer system hosts the replicated virtual machine.

In another embodiment, the replicated virtual machine is transferred or otherwise installed on a different host computer system. In other words, the original virtual machine is run on one host computer system while the replicated virtual machine is run on a different, separate host computer system. FIG. 2 shows the embodiment of offloading the operation of an application onto a replicated virtual machine running on a host computer system different from that of the original virtual machine. Host computer system 103 is a physical computer which may include one or more processors, memory chips, non-volatile storage, I/O interface, and a bus to interconnect the various hardware components. Host computer system 103 has an operating system and virtualization software installed. The virtual machine software is used to create multiple virtual machines (e.g., VM1 204, VM2 205, and VM3 206). A separate physical computer 104 has its own dedicated hardware components, such as one or more processors, memory chips, non-volatile storage, I/O interface, and a bus to interconnect the various hardware components. Also running on host computer system 104 is an operating system and virtualization software. The virtualization software can be used to create a number of virtual machines (e.g., VM4 207). The hardware components and/or operating system of host computer system 103 can be different from that of host computer system 104. The host computer systems 103 and 104 can be networked and/or share a common non-volatile memory 105.

In this embodiment, when an application is to be run one of the virtual machines which may tend to put a strain on the computing resources of the corresponding host system, the application can be run on a replicated virtual machine. This is accomplished by replicating the original virtual machine. In other words, a copy, clone, or duplicate virtual machine is created on the computer system hosting the original virtual machine. The replicated virtual machine is then moved, installed, or otherwise transferred to a different host computer system. For example, the virtual machine VM2 running on host computer system 103 can have a replicated virtual machine VM2* 208 running on host computer system 104. This implementation enables the original virtual machine to continue its normal operation on its host computer system without being affected by the operations being performed by the replicated virtual machine. The original virtual machine is not affected because the computing resource-intensive application is being run on a different host system. Again, once the computing resource-intensive application completes its execution, the replicated virtual machine can be discarded.

Figure 3:
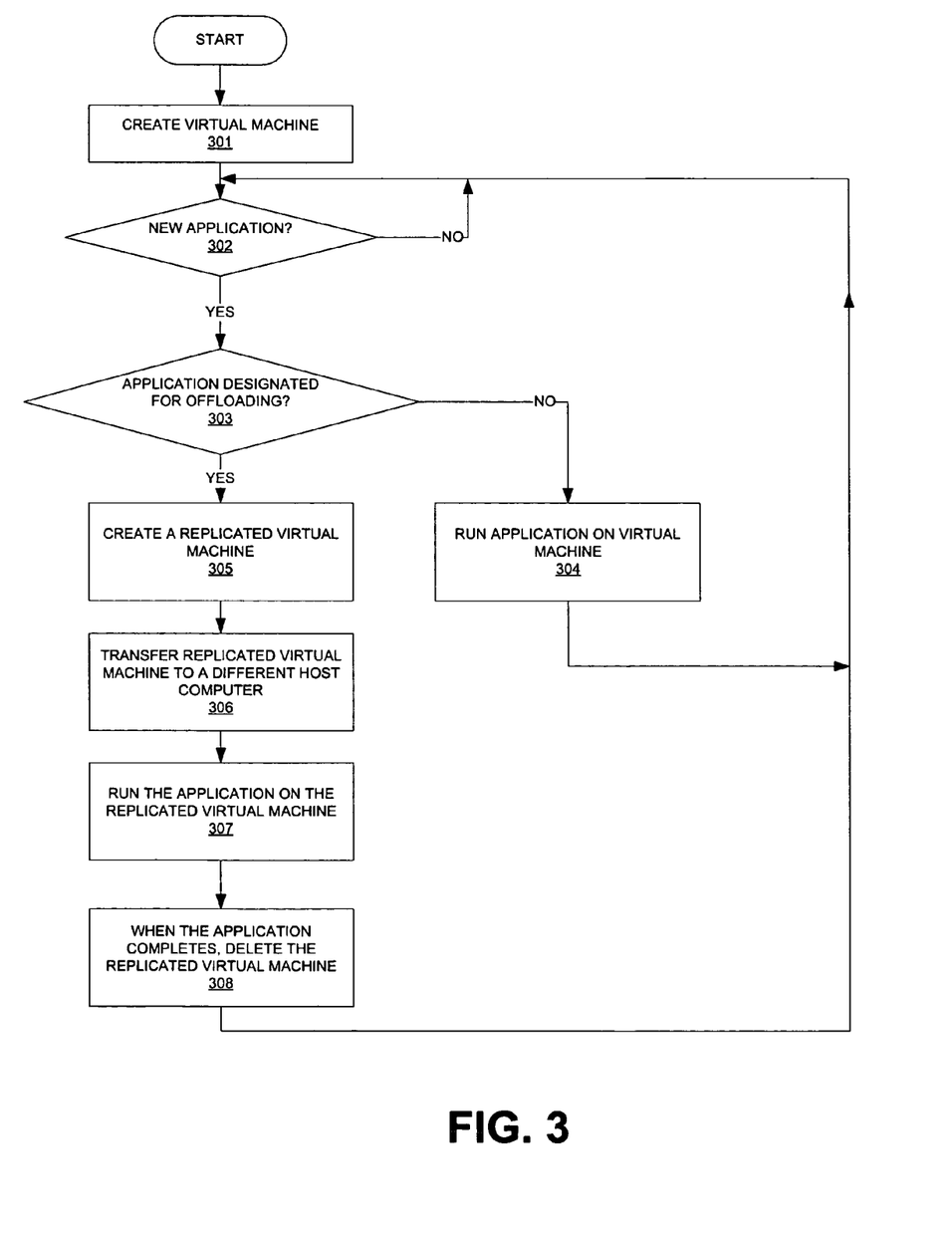
FIG. 3 is a flowchart depicting the process flow for offloading an application onto a replicated virtual machine.

FIG. 3 is a flowchart describing the processes for offloading operations onto a replicated virtual machine. Initially, in step 301, a virtual machine is created. Step 302 determines when an application is to be run on the virtual machine. Basically, one or more applications are intended to be run on the virtual machine. However, certain ones of these applications intended to be run on the virtual machine created in step 301 can be expeditiously offloaded onto and run by a virtual machine which is a replica of the virtual machine originally created in step 301. It should be noted that any application can be offloaded onto the replicated virtual machine. Some good candidates for offloading are those applications which are run either periodically, occasionally, or infrequently. Other good candidates are those applications which require a great amount of processing power, I/O bandwidth, and/or memory throughput. In one embodiment, an IT administrator determines certain types or specific ones of applications are to be offloaded. In another embodiment, an application is offloaded if a network administrator detects that a host computer system is being overloaded. Software can be designed to detect that a host computer system is being overloaded and automatically offload one or more applications onto a replicated virtual machine. As described above, the replicated virtual machine can reside on a different host computer system. If an application is not designated for offloading, as determined in step 303, that application is run on the virtual machine, step 304. In this case, the process begins anew at step 302. Steps 302-304 enable several applications to be running simultaneously on the virtual machine created in step 301.

However, if step 303 determines that an application intended for the virtual machine created in step 301 is to be offloaded, a new virtual machine is created in step 305. This new virtual machine is a replicate, clone, or copy of the virtual machine originally created in step 301. In step 306, the replicated virtual machine can be transferred to a different host computer system. Step 306 is optional. The offloaded application is run on the replicated virtual machine according to step 307. In step 308, when the offloaded application completes, the replicated virtual machine can be deleted. It should be noted that one or more applications can be running on the virtual machine created in step 301 in conjunction with one or more offloaded applications running on the replicated virtual machine created in step 305.

Figure 4:
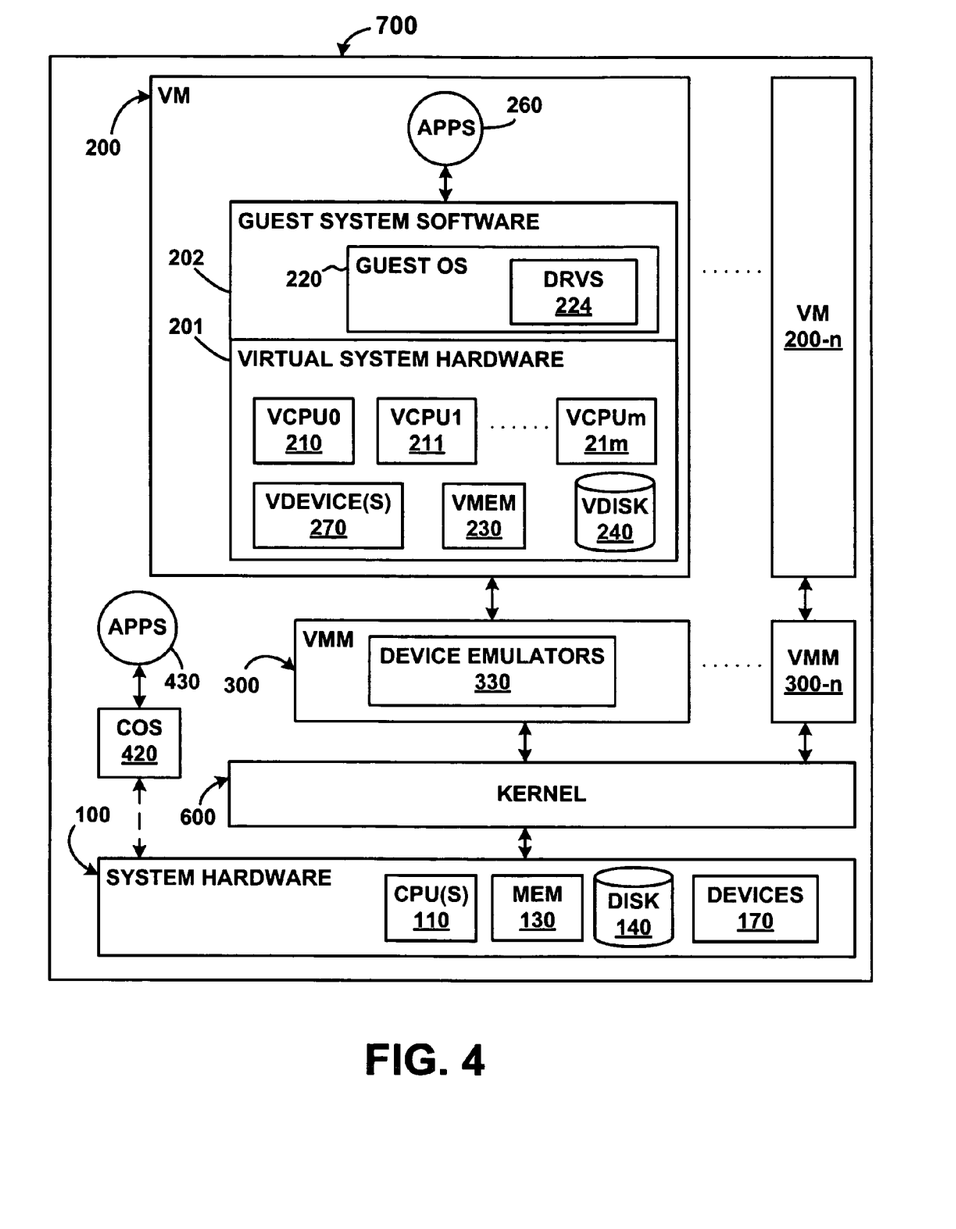
FIG. 4 illustrates an exemplary non-hosted virtualized computer system.
Figure 5:
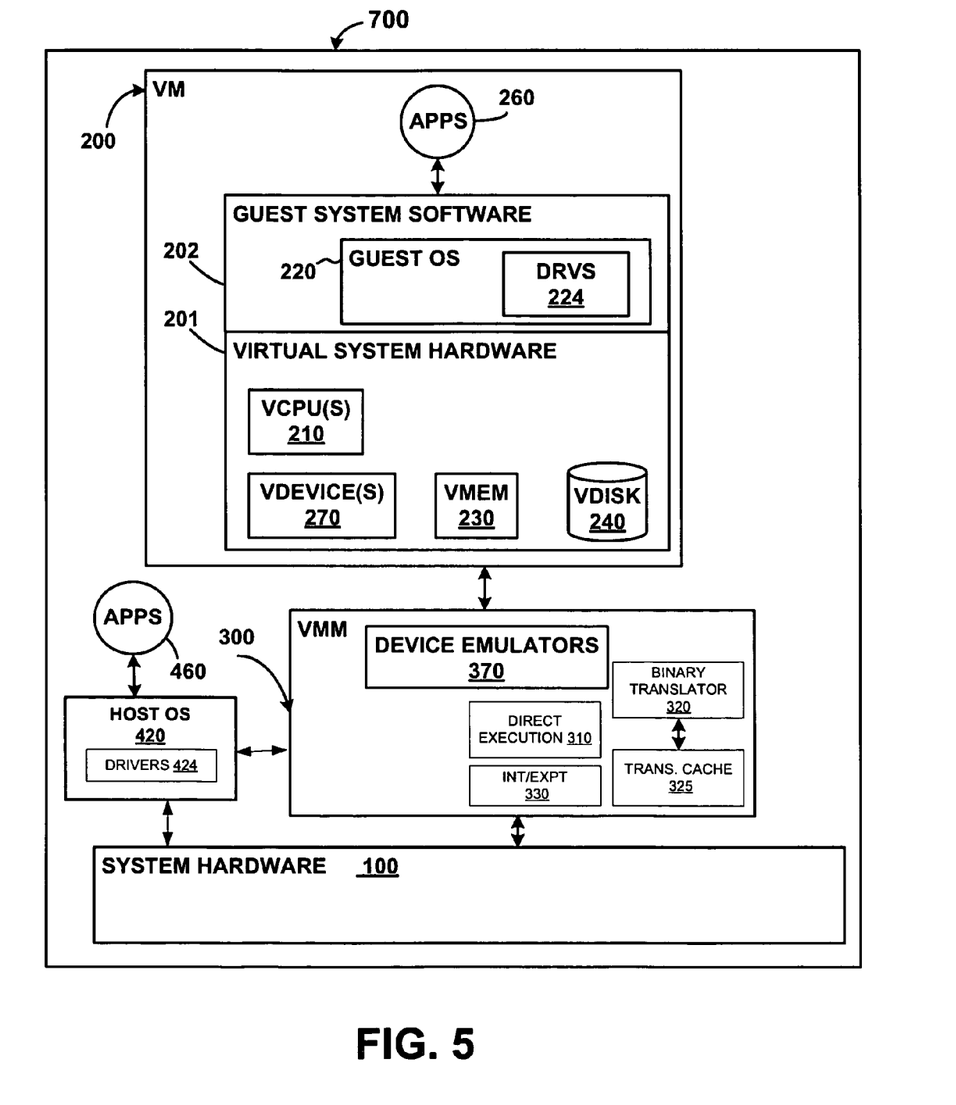
FIG. 5 illustrates an exemplary hosted virtualized computer system.

Detailed descriptions of how a virtual machine is created, replicated, and transferred to a different host computer system is now disclosed. FIGS. 4 and 5 show a virtual machine and its functions. As is well known in the field of computer science, a virtual machine (VM) is a software abstraction—a "virtualization"—of an actual physical computer system. FIG. 4 shows one possible arrangement of a computer system 700 that implements virtualization. A virtual machine (VM) 200, which in this system is a "guest," is installed on a "host platform," or simply "host," which will include a system hardware 100, that is, a hardware platform, and one or more layers or co-resident components comprising system-level software, such as an operating system (OS) or similar kernel, a virtual machine monitor, or some combination of these.

As software, the code defining the VM will ultimately execute on the actual system hardware 100. As in almost all computers, this hardware will typically include one or more CPUs 110, some form of memory 130 (volatile and/or non-volatile), one or more storage devices such as one or more disks 140, and one or more devices 170, which may be integral or separate and removable.

In many existing virtualized systems, the hardware processor(s) 110 are the same as in a non-virtualized computer with the same platform, for example, the Intel x-86 platform. Because of the advantages of virtualization, however, some hardware vendors have proposed, and are presumably developing, hardware processors that include specific hardware support for virtualization.

Each VM 200 will typically mimic the general structure of a physical computer and as such will usually have both virtual system hardware 201 and guest system software 202. The virtual system hardware typically includes at least one virtual CPU 210, virtual memory 230, at least one virtual disk or storage device 240, and one or more virtual devices 270. Note that a storage disk—virtual 240 or physical 140—is also a "device," but is usually considered separately because of the important role it plays. All of the virtual hardware components of the VM may be implemented in software to emulate corresponding physical components. The guest system software typically includes a guest operating system (OS) 220 and drivers 224 as needed, for example, for the various virtual devices 270.

If the VM 200 is properly designed, applications 260 running on the VM will function as they would if run on a "real" computer, even though the applications are running at least partially indirectly, that is via the guest OS 220 and virtual processor(s).

Executable files will be accessed by the guest OS from the virtual disk 240 or virtual memory 230, which will be portions of the actual physical disk 140 or memory 130 allocated to that VM. Applications may be installed within the VM in a conventional manner, using the guest OS. Then, the guest OS retrieves files required for the execution of such installed applications from the virtual disk in a conventional manner. The design and operation of virtual machines in general are known in the field of computer science.

Some interface is usually required between a VM 200 and the underlying host platform (in particular, the hardware CPU(s) 110 and any intermediate system-level software layers), which is responsible for actually submitting and executing VM-issued instructions and for handling I/O operations, including transferring data to and from the hardware memory 130 and storage devices 140. A common term for this interface or virtualization layer is a "virtual machine monitor" (VMM), shown as component 300. A VMM is usually a software component that virtualizes at least some of the resources of the physical host machine, or at least some hardware resource, so as to export a hardware interface to the VM corresponding to the hardware the VM "thinks" it is running on. As FIG. 4 illustrates, a virtualized computer system may (and usually will) have more than one VM, each of which may be running on its own VMM.

The various virtualized hardware components in the VM, such as the virtual CPU(s) 210, etc., the virtual memory 230, the virtual disk 240, and the virtual device(s) 270, are shown as being part of the VM 200 for the sake of conceptual simplicity. In actuality, these "components" are often implemented as software emulations included in the VMM. One advantage of such an arrangement is that the VMM may (but need not) be set up to expose "generic" devices, which facilitate, for example, migration of VM from one hardware platform to another.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, this invention is not restricted to use in systems with any particular "degree" of virtualization and is not to be limited to any particular notion of full or partial ("para-") virtualization.

In addition to the distinction between full and partial (para-) virtualization, two arrangements of intermediate system-level software layer(s) are in general use—a "hosted" configuration (illustrated in FIG. 5) and a non-hosted configuration (illustrated in FIG. 4). In a hosted virtualized computer system, an existing, general-purpose operating system forms a "host" OS that is used to perform certain input/output (I/O) operations, alongside and sometimes at the request and direction of the VMM 300. The host OS 420, which usually includes drivers 424 and supports applications 460 of its own, and the VMM are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators 370, FIG. 5 also illustrates some of the other components that are also often included in the VMM of a hosted virtualization system; many of these components are found in the VMM of a non-hosted system as well. For example, exception handlers 330 may be included to help context-switching (see again U.S. Pat. No. 6,496,847), and a direct execution engine 310 and a binary translator 320 with associated translation cache 325 may be included to provide execution speed while still preventing the VM from directly executing certain privileged instructions (see U.S. Pat. No. 6,397,242, Devine, et al., "Virtualization System Including a Virtual Machine Monitor for a Computer with a Segmented Architecture," 28 May 2002).

In many cases, it may be beneficial to deploy VMMs on top of a software layer—a kernel 600—constructed specifically to provide efficient support for the VMs. This configuration is frequently referred to as being "non-hosted." Compared with a system in which VMMs run directly on the hardware platform (such as shown in FIG. 5), use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as any temporary "console" operating system 420 that, in some systems, is included to boot the system as a whole and for enabling certain user interactions with the kernel. The console OS in FIG. 4 may be of the same type as the host OS in FIG. 5, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson, et al., "Computer Configuration for Resource Management in Systems Including a Virtual Machine," 1 Nov. 2005.)

Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Unless otherwise indicated, this invention may be used in virtualized computer systems having any type or configuration of virtualization software. Moreover, the invention is described and illustrated primarily as including one or more virtual machine monitors that appear as separate entities from other components of the virtualization software. This is only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software.

Figure 6:
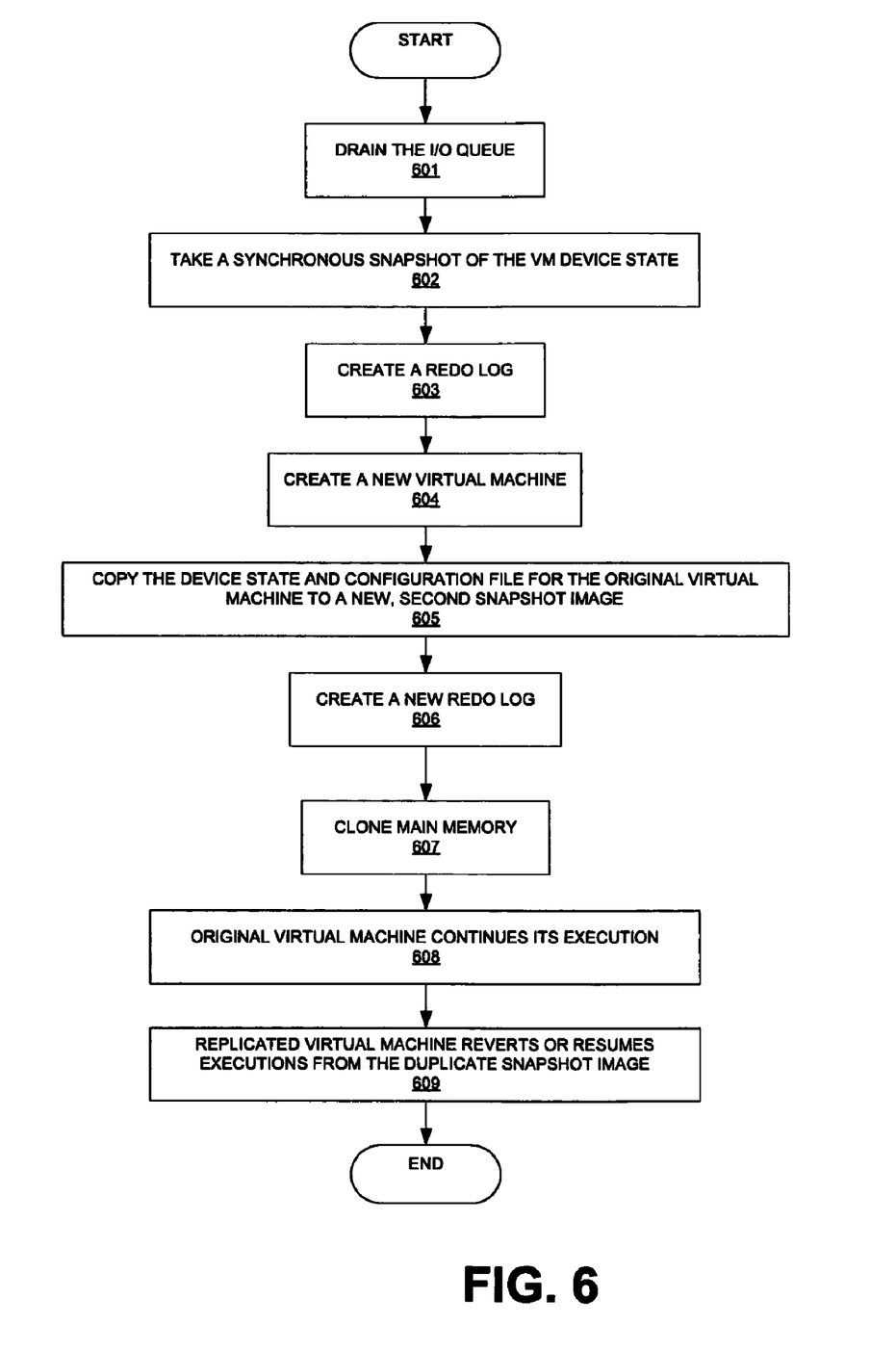
FIG. 6 is a flowchart depicting the process flow for creating a replicated virtual machine.

The process for creating and running a replicated virtual machine is now described in detail with reference to FIG. 6. The first step 601 entails draining the I/O queue of the original virtual machine. This step ensures that there are not I/O operations in-flight; this step is similar to when taking a snapshot. Next, in step 602, a synchronous snapshot of the virtual machine device state is taken, excluding the main memory. This snapshot has its own configuration file and saved device state. The snapshot also creates one or more redo logs—one for each virtual disk of the virtual machine step 603. The redo log is associated with an "original" disk, which is the original virtual machine's disk at the time the snapshot was created. Also, although in one implementation the present claimed subject matter utilizes redo logs, other methods can also be utilized to capture disk state deltas (incremental changes) that the original virtual machine and the cloned virtual machine accumulate after the creation of the cloned virtual machine. For example, a virtual machine can be disk backed by a Storage Area Network (SAN) Logical Unit Number (LUN). A first SAN LUN can be mirrored to a second SAN LUN. At the time of the snapshot creation, break the mirror and the mirrored second SAN LUN can be utilized for the cloned virtual machine. Also, the second SAN LUN can be discarded when the cloned virtual machine is discarded. In step 604, a new virtual machine is created.

The new virtual machine can be created on the same host computer system as that of the original virtual machine, or alternatively, the new virtual machine can be created on a different host computer system. This new virtual machine will now be made to be a replica of the original virtual machine that was quiesced in step 601. The replication entails copying the device state and the configuration file corresponding to the original virtual machine to a new, second snapshot, step 605. This represents the partial saved state of the replicated virtual machine. It should be noted that saving this state is a fast operation that can be done in tens of milliseconds. Next, step 606, a new redo log is created for the replicated virtual machine. This redo log uses the original virtual machine's disk as its disk as well. With this, there are two copies of the entire virtual machine state needed to run the virtual machines, except for the main memory. In step 607, a clone of the main memory is created. There are several options for cloning the main memory. The options are dependent upon how the memory virtualization is implemented. In one embodiment, memory snapshots in the background can be taken using a copy-on-write technology. The memory snapshots, in one example, can be utilized to help reduce the downtime the original virtual machine encounters during the clone operation.

For a hosted virtualization system, one option is to rename the original virtual machine's memory file to the snapshot memory-image file at the time the snapshot is created. This operation will continue doing memory copies in the background. A new empty file is created to represent guest memory when continuing execution for the original virtual machine. This new file is populated with demand paging and prefetching from the snapshot memory-image file. A new empty file is created to represent the replicated virtual machine's memory on the host and start executing the replicated virtual machine after reverting to the saved snapshot state for all device state except main memory. The new memory file is populated in the replicated virtual machine with demand paging and prefetching from the snapshot memory-image file in the background. Upon successful cloning of the main memory, the original virtual machine can simply continue its execution, step 608. Meanwhile, according to step 609, the replicated virtual machine can effectively revert or resume from the duplicate snapshot image that was created in step 605. A detailed description relating to the restoring, porting, replicating, and checkpointing of virtual machines can be found in U.S. Pat. No. 6,795,966 entitled, "Mechanism For Restoring, Porting, Replicating and Checkpointing Computer Systems Using State Extraction," to Lim et al., issued Sep. 21, 2004, which is incorporated into this application by reference in its entirety. In one embodiment, the virtual machine is cloned off-line.

In another embodiment, the virtual machine is "hot cloned," that is, it is cloned while the host system(s) and the original virtual machine are powered up and running. This hot cloning technique is described in detail in U.S. Ser. No. 60/788,298, entitled, "Real Time Cloning of a Virtual Machine," to Venkitachalam G. et al, filed 31 Mar. 2006, which is incorporated into this application by reference in its entirety.

Figure 7:
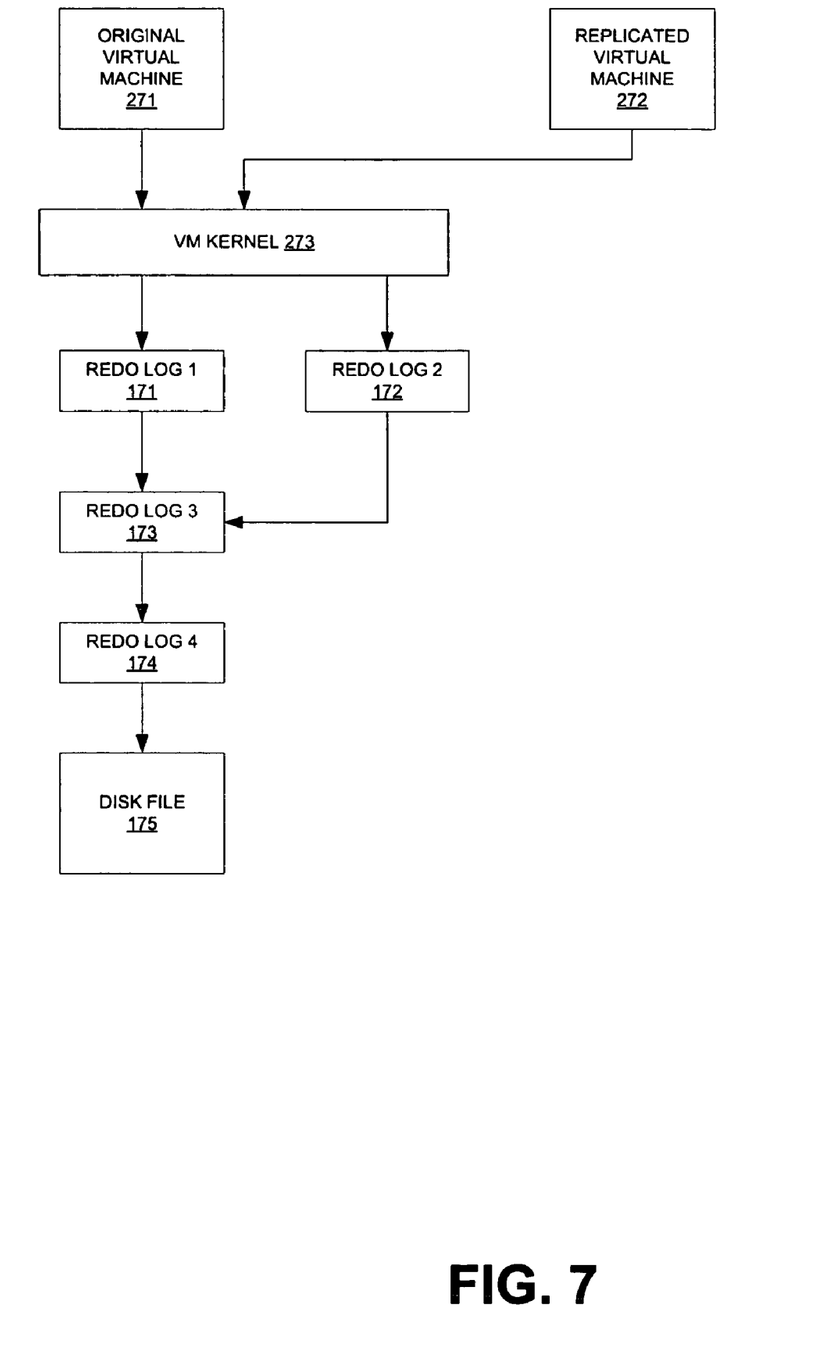
FIG. 7 illustrates a block diagram of the I/O operations between an original virtual machine and its counterpart, a replicated virtual machine.

FIG. 7 shows a block diagram of an exemplary replicated virtual machine. An original virtual machine is depicted as 271. In order to replicate the original virtual machine 271, its internal state is obtained and used to create the replicated virtual machine 272. A duplicate of the state of the disk images of the original virtual machine 271 can be created. Re-do logs 171-174, are added to the I/O path of both the original and the replicated virtual machines. Initially, the original virtual machine 271 is running, reading, and writing to its disk images and potentially already has a stack of redo logs 173 and 174 in its I/O path already. In preparation for the cloning or replication, operations on the original virtual machine 271 are temporarily suspended. A duplicate copy of the internal state of the original virtual machine 271 is created. At this point, both the original virtual machine 271 and the replicated virtual machine 272 are suspended. A new redo log 171 is added to the I/O path of the original virtual machine via appropriate components of the virtualization software, shown in FIG. 7 as the virtual machine kernel layer 273. Likewise, a new redo log 172 is added to the I/O path of the replicated virtual machine 272 via the virtual machine kernel layer 273. The replicated virtual machine is disconnected from any network infrastructure. The original virtual machine 271 can continue its operation. Execution on the replicated virtual machine can also resume.

A post-replication script is preferably triggered on the replicated virtual machine 272. This script is used to adjust the configuration of the replicated virtual machine. Examples for post-replication scripts include shutting down all the network interfaces to prevent applications from running into timeouts; reconfiguring the network interfaces (e.g., changing IP/MAC addresses to avoid IP/MAC address duplication) and reconnecting to the virtual network infrastructure. This enables the replicated virtual machine to communicate with other hosts. A script could also invoke a given command (e.g., triggering data mining, backup, or virus scanning that were supposed to be offloaded from the original virtual machine).

After the task that has been offloaded to the replicated virtual machine 272 completes, the replicated virtual machine 272 is usually discarded. At this point, the redo log 171 can be committed into redo log 173 to return the I/O path of the original virtual machine 271 to its original state.

In the case of the replicated virtual machine being retained, it is still possible to return the I/O path of the original virtual machine 271 to its original state if a new virtual disk for the replicated virtual machine 272 is constructed that does not depend on any redo logs or disk files that are also part of the I/O path of the original virtual machine 271.

In the given example, this can be obtained by constructing a new base disk out of the content of disk file 175 and redo logs 173 and 174. Redo log 172 can then be associated with this new base disk.—Since the I/O paths of replicated and original virtual machine are now separate, redo log 171 can now be committed into redo log 173 in order to return the I/O path of the original virtual machine 271 to the same state it was in before the replicated virtual machine 272 was created.

Detailed descriptions for implementing and handling various applications which can be offloaded onto a replicated or cloned virtual machine are now disclosed. For example, performing a backup can be a fairly resource-intensive process. Since physical machines are usually underutilized during the time when a backup is being performed, there are enough computing and I/O resources available. But in a virtual machine environment, these additional resource demands can cause a severe performance degradation both for the virtual machine running the resource-intensive task and for other virtual machines running on the same physical hardware. One solution is to offload the resource-intensive parts of performing the backup to another (physical and/or virtual) host by replicating or cloning the virtual machine at issue. There are different ways of accomplishing this. These different approaches involve creating a replica of the virtual machine and using the replicated virtual machine for offloading.

In one embodiment, a replicated virtual machine is created based on the original virtual machine. All the backup activity is then performed in the replicated virtual machine. This offloads backup tasks from the original virtual machine, but still consumes resources of the physical host that both virtual machines are running on. This issue can be avoided by moving the replicated virtual machine onto a different host computer. This host computer can have a special-purpose configuration to better support the requirements of the backup task. It can be dedicated to the task that is supposed to be offloaded. An example for this would be a physical machine that is specifically configured to support virtual machines performing backup. For example, this physical machine could have additional I/O adapters to allow for better data throughput.

In another embodiment, it is possible to perform the quiesceing operation in the replicated virtual machine after the replicated virtual machine has been created. Immediately after the quiesceing operation, the replicated virtual machine itself can be discarded, while the disk image of the clone is retained. The disk image can then be used for backup purposes. An implementation example for this would be using standard backup client software in the replicated virtual machine to do the quiesceing, which reduces the quiesced state to the state of the data stored on the replicated virtual machine's persistent storage (e.g., disk image and/or redo log). Third party backup software has hooks that enable user-supplied commands to run at well-defined points during the quiesceing/backup process. A script can be invoked by the command hook that allows user-specific commands to be run after the quiesceing is complete. Once the disk images are created, they can be used by special-purpose virtual machine dedicated for backup purposes. Hardware functionality, such as SCSI hot-add can be emulated to cause the operating system running in the virtual machine to recognize these disk images as newly attached virtual disks. It is also possible to use some kind of specific protocol that enables the operating system running in the backup virtual machine to access the file system within the disk image. This can be done through a network-specific protocol, such as a standard file sharing protocol with a disk-image aware server, or a way that is specific to virtual machines.

In one embodiment, the backup virtual machine is shutdown, and the disk image is statically attached to be backed up to the virtual machine by altering its hardware configuration accordingly and then powering the virtual machine back on. Once the file system within the disk image is accessible by the operating system running in the backup virtual machine, standard backup software installed in the backup virtual machine can take care of performing the actual scanning and data movement parts of the backup task. Another embodiment of backing up the disk images is to make them accessible to a physical machine. This can be done by enabling the physical machine to access the disk images just as physical disk drives by providing a special driver for the operating system running on the physical machine. Again, once the file system within the disk image is accessible by the operating system running on the physical machine, standard backup software can be used to perform the scanning and data movement parts of the backup task.

Another exemplary application suited for offloading to a replicated virtual machine relates to data analysis. Data analysis and data mining tasks can be fairly resource-intensive. Performing data analysis/mining on a replicated virtual machine segregates the impact of those tasks on a set of data. These tasks can be common for databases (e.g., report generation) and can be fairly resource-intensive, in terms of CPU cycles, amount of memory consumed and I/O bandwidth as well, depending on the nature of the data set and the complexity of the analysis performed.

Yet another application suited for offloading onto a replicated virtual machine relates to virus scanning. Virus scanning is periodically done in order to check for potentially malicious code. If the virus scan finds one or more viruses, the original virtual machine can be quarantined. Again, this scanning operation can be fairly resource-intensive; the resource usage spike might be prohibitive in a virtual machine environment unless it is offloaded. By offloading this task onto the replicated virtual machine, the virus scan can run on the replicated disk image. This enables the segregation of the resource requirements of the scanning process from the original virtual machine and enables the enforcement of resource utilization policies for the scanning process without affecting the original virtual machine. For example, the resources granted to the replicated virtual machine could be bounded such that the overall impact of performance for other virtual machines is negligible, or the replicated virtual machine could be moved off to a different physical host computer that might be optimized for handling virtual machines performing certain specific tasks.

Thus, a method and system for offloading an application intended to be run on an original virtual machine onto a replicated virtual machine is disclosed. Although the detailed description is directed to a virtual machine environment, the present invention is not limited to be practiced only on virtual machines. In fact, the present invention is applicable to non-virtual computer systems as well. For example, the state information stored in volatile and/or non-volatile memory (e.g., registers, caches, and hard disks) for a physical computer can be copied and loaded onto another physical computer system. The transfer can be accomplished over a network. The application can be run on this second physical computer system. The results can be displayed, stored, or merged with the first physical computer system. Furthermore, one embodiment of the present invention can be in software form stored on a DVD, disk file, or some other type of computer-readable medium.

What is claimed is:

1. A method for offloading a pre-designated software application intended to be run on a first virtual machine onto a second virtual machine:
   creating the first virtual machine;
   determining that the pre-designated software application is to run on the first virtual machine;
   detecting that the pre-designated software application is to be offloaded from the first virtual machine, including determining that continued running of the software application on the first virtual machine will detrimentally impact other operations by the first virtual machine;

as a response to detecting that the pre-designated software application is to be offloaded, creating the second virtual machine for execution of the software application, wherein the second virtual machine is a replica of the first virtual machine, including enabling each of the first and second virtual machines to execute; and running the pre-designated software application on the second virtual machine, while the first virtual machine continues to execute the other operations.

2. The method of claim 1 further comprising:

running the first virtual machine on a first host computer system;

running the second virtual machine on a second host computer system, wherein the second host computer system comprises hardware components separate from hardware components of the first host computer system.

3. The method of claim 2, wherein by offloading the software application to run on the second virtual machine installed on the second host computer system, the software application does not reduce computing resources for any applications running on the first virtual machine installed on the first host computer.

4. The method of claim 1, wherein the software application is run periodically.

5. The method of claim 1 wherein detecting that the software application is to be offloaded is based on determining that the computer resource consumption required to run the software application degrades performance of other software applications running on the first virtual machine.

6. The method of claim 1 wherein the software application comprises a backup software application to back up files corresponding to the first virtual machine.

7. The method of claim 1, wherein the software application comprises virus checking software application for checking the first virtual machine for viruses.

8. The method of claim 1, wherein the software application comprises a data-mining software application which analyzes data corresponding to the first virtual machine.

9. The method of claim 1 further comprising:

deleting the second virtual machine after the software application completes execution, such that the second virtual machine is created as a response to detecting that the software application is to be offloaded and is deleted in response to determining that execution of the software application is completed.

10. The method of claim 1 further comprising:

allocating computing resources to the second virtual machine, wherein the second virtual machine is prevented from exceeding an allocation of the computing resources.

11. The method of claim 10, wherein the second virtual machine and the first virtual machine are run on a same host computer system.

12. A computing system for handling offloaded software applications comprising:

a first virtual machine having a set of state information;

a second virtual machine, wherein the second virtual machine is specifically instantiated to have, at one point in time, the same state information as that of the first virtual machine; and at least one processor cooperative with the first and second virtual machines and configured to:

determine whether a software application directed for execution on the first virtual machine is pre-designated for offloading from the first virtual machine, including determining that continued running of the software application on the first virtual machine will detrimentally impact other operations by the first virtual machine;

execute the software application on the second virtual machine in response to a determination that the software application is designated for offloading; and execute the software application on the first virtual machine in response to a determination that the software application is not designated for offloading.

13. The computing system of claim 12, wherein the first virtual machine and the second virtual machine reside on different physical host computers.

14. The computing system of claim 12, wherein the first virtual machine and the second virtual machine reside on a same physical host computer and resource constraints are applied to the second virtual machine, the processor further being cooperative to delete the second virtual machine as a response to detecting completion of execution of the software application.

15. The computer system of claim 12 further comprising:

a first redo log coupled to a first virtual machine, wherein data from the first virtual machine is written to the first redo log; and a second redo log coupled to a second virtual machine, wherein data from the second virtual machine is written to the second redo log.

16. The computer system of claim 12, wherein running the software application on the second virtual machine has no affect on a different application concurrently running on the first virtual machine.

17. The computer system of claim 12, wherein the application comprises a backup application.

18. The computer system of claim 12, wherein the application comprises a data analysis application.

19. The computer system of claim 12, wherein the application comprises a virus scanning application.

* * * * *